US 6,541,959 B2

(12) United States Patent
Gudgeon et al.

(10) Patent No.: US 6,541,959 B2
(45) Date of Patent: Apr. 1, 2003

(54) ANGULAR POSITION SENSING SYSTEM WITH MAGNET AND ROTOR ARRANGEMENT

(75) Inventors: Joseph A. Gudgeon, La Farge, WI (US); Floyd I. Baker, Readstown, WI (US); Geoffrey D. Ziegahn, Richland Center, WI (US)

(73) Assignee: S & S Cycle, Inc., Viola, WI (US)

( * ) Notice: Subject to any disclaimer, the term of this patent is extended or adjusted under 35 U.S.C. 154(b) by 0 days.

(21) Appl. No.: 09/794,316

(22) Filed: Feb. 27, 2001

(65) Prior Publication Data

US 2002/0118012 A1 Aug. 29, 2002

(51) Int. Cl.[7] .............................. G01B 7/30; G01P 3/46; G01P 3/488; F02P 7/067; G01D 5/02
(52) U.S. Cl. .................. 324/207.15; 324/163; 324/174; 324/207.25; 123/617
(58) Field of Search ................................. 324/160, 163, 324/166, 173, 174, 207.13, 207.22, 207.25; 310/168, 68 B; 123/146.5 A, 406.52, 406.58, 617

(56) References Cited

U.S. PATENT DOCUMENTS

| 3,710,246 A | * | 1/1973 | Herring ................... 324/179 X |
| 4,180,753 A | * | 12/1979 | Cook, II .................. 324/174 X |
| 4,305,072 A | * | 12/1981 | Makita .................... 324/174 X |
| 4,970,462 A | * | 11/1990 | Richmond ................ 324/174 |
| 5,019,774 A | * | 5/1991 | Rosenberg ................ 324/174 |
| 5,233,967 A |   | 8/1993 | Peller |
| 5,390,758 A |   | 2/1995 | Hunter et al. |
| 5,508,608 A | * | 4/1996 | Goossens .................. 324/174 |
| 5,510,708 A | * | 4/1996 | Shirai et al. .............. 324/174 |
| 5,575,268 A |   | 11/1996 | Hirano et al. |
| 5,765,290 A |   | 6/1998 | Rank et al. |
| 5,777,290 A |   | 7/1998 | Tzanev |

OTHER PUBLICATIONS

"Color photos of General Motors reluctor", components and assembly, 14 pages (Date Unknown).
"Custom Variable Reluctance Sensors", *American Electronic Components, Inc.*, 1 page (Date Unknown).
"Infrared Products", *Honeywell*, Catalog E26, 2 pages (Jan. 1998).
"Service Manual", *Harley–Davidson Motor Company*, pp. 3–59–3–61, 9–6–9–9, 9–71, 9–85–9–86 (1997).
"Solid State Sensors", *Honeywell*, Catalog 20, 2 pages (Oct. 1997).

* cited by examiner

Primary Examiner—Gerard R. Strecker
(74) Attorney, Agent, or Firm—Merchant & Gould P.C.

(57) ABSTRACT

A sensing system for measuring the angular displacement of a rotating shaft is disclosed. The sensing system comprises a rotor and a sensor assembly disposed within the rotor. The rotor is constructed and arranged to be securably mounted to the shaft such that the rotor rotates in concert with the shaft. Furthermore, the rotor defines a plurality of teeth extending radially inwardly towards a center of the shaft. The sensor assembly comprises a sensor housing and a magnet arrangement disposed within the housing. The magnet arrangement defines a magnetic flux path between the sensor assembly and the rotor. As a result, the magnet arrangement and the rotor cooperate to define a magnetic circuit. Changes in magnetic flux through the magnetic circuit can be measured to determine the angular displacement of the rotating shaft. Preferably, the sensing system of the present disclosure can be disposed within an existing housing with minimal effort, thereby, providing a reliable mechanism for precisely measuring the angular displacement of a rotating shaft.

23 Claims, 9 Drawing Sheets

PRIOR ART

ANGULAR POSITION SENSING SYSTEM WITH MAGNET AND ROTOR ARRANGEMENT

TECHNICAL FIELD

The present invention relates generally to an angular position sensing system and, more particularly, to a variable reluctance angular position sensing system for measuring the angular displacement of a rotating shaft.

BACKGROUND

Variable reluctance sensing systems used to measure the angular displacement of a rotating shaft are known in the art. In many typical applications, variable reluctance sensing systems are used in conjunction with internal combustion engines, such as automobile or motorcycle engines, to measure the rotational speed of various components within the engine. For example, many variable reluctance sensing systems are used to measure the angular displacement of the engine camshaft or the engine crankshaft while the engine is operating. Sensed angular displacement data can be provided to an electronic engine control system to control engine performance events, such as, engine ignition events, fuel injection events, as well as other similar engine functions or performance events.

FIG. 1 illustrates a typical variable reluctance sensing system 10 used to measure the angular displacement of a rotating shaft 12, such as, an engine crankshaft or camshaft. As shown in FIG. 1, the sensing system 10 typically includes a sensor 16 having a magnet 20 that is disposed through a side wall of the engine housing 18. The sensor 16 can be used to detect the position and speed of a rotating toothed or slotted wheel 14 (e.g., a spur gear) that is rigidly secured or attached to the rotating shaft 12. The sensor 16 and the slotted wheel 14 create a magnetic flux path (e.g., a magnetic circuit) between the two poles of the magnet 20. In particular, the magnet 20 establishes a magnetic field through the slotted wheel 14 and the housing 18 as shown by the dotted field lines in FIG. 1. As the slotted wheel 14 rotates, the sensor 16 detects and/or measures any changes in the magnetic flux through the magnetic circuit. Furthermore, as mentioned above, the sensor 16 can be electrically coupled to an electronic controller that can be used to control engine performance events (e.g., fuel injection, engine ignition, etc.) to improve engine performance.

There are several shortcomings with most existing variable reluctance systems. For example, while most existing variable reluctance sensing systems are accurate and reliable, they cannot be readily implemented on existing engines not equipped to accommodate these systems. To accommodate most existing variable reluctance sensing systems, significant modifications to the engine (including the engine housing 18 and/or the rotating shaft 12) are typically required. Making such modifications to an engine not previously designed to accommodate a variable reluctance sensing system would be time consuming and costly. Furthermore, because at least a portion of the magnetic field travels outside of the engine housing 18, the strength of the magnetic flux through the magnetic circuit may be degraded due to interference.

Improvements in angular position systems used to measure the angular displacement of a rotating shaft are, therefore, sought.

SUMMARY

The present disclosure relates generally to a sensing system. More particularly, the present disclosure relates to a variable reluctance sensing system for measuring the angular displacement of a rotating shaft. In one aspect of the disclosure, the sensing system comprises a rotor and a sensor assembly disposed within the rotor. The rotor is constructed and arranged to be securably mounted to the shaft such that the rotor rotates in concert with the shaft. Furthermore, the rotor defines a plurality of teeth extending radially inwardly towards a center of the shaft. The sensor assembly comprises a sensor housing and a magnet arrangement disposed within the housing. The magnet arrangement defines a magnetic flux path between the sensor assembly and the rotor. As a result, the magnet arrangement and the rotor cooperate to define a magnetic circuit. Changes in magnetic flux through the magnetic circuit can be measured to determine the angular displacement of the rotating shaft.

Further to this aspect, the sensing system comprises an electrical conductor in electromagnetic communication with the magnet arrangement. The electrical conductor is adapted for providing an input signal to an electrical control system. The input corresponds to the angular displacement of the shaft. The electrical conductor can comprise a helical coil in electromagnetic communication with the magnet arrangement.

Still further in this aspect, the magnetic arrangement can include a permanent magnet and at least one magnetic extension. The magnetic extension is in electromagnetic communication with and extends away from a pole of the magnet to a position proximate to a periphery of the rotor. Alternatively, the magnetic arrangement can include a first and second magnetic extension. The first magnetic extension can be arranged such that it is in electromagnetic communication with and extends away from a first pole of the magnet to a first position proximate to a periphery of the rotor. Conversely, the second magnetic extension can be arranged such that it is in electromagnetic communication with and extends away from a second pole of the magnet to a second position proximate to the periphery of the rotor opposite the first position.

Still further in this aspect, the first magnetic extension can be in electromagnetic communication with the magnet via a first support member extending laterally from the first pole of the magnet. Similarly, the second magnetic extension can be in electromagnetic communication with the magnet via a second support member extending laterally from the second pole of the magnet.

The sensing system can be configured to detect a first extended valley defined in the plurality of teeth. The period between the detection of the first extended valley corresponds to time taken to complete a single revolution of the shaft. Alternatively, the sensing system can be further configured to detect a second extended valley defined in the plurality of teeth opposite the first extended valley. The period between the detection of the first extended valley and the second extended valley corresponds to time taken to complete a half revolution of the shaft.

In another aspect, the sensing system comprises a rotor and a sensor assembly disposed within the rotor. In this aspect, the rotor can be secured to the shaft such that the rotor rotates in concert with the shaft. Furthermore, the rotor defines a plurality of teeth extending radially inwardly towards a center of the shaft. The sensor assembly can comprise a sensor housing and a magnet arrangement disposed within the sensor housing. The magnet arrangement defines a magnetic flux path between the sensor assembly and the rotor. The magnet arrangement can comprise a permanent magnet and at least one magnetic extension in electromagnetic communication with and extending from a pole of the magnet to a position proximate to a periphery of the rotor. The sensing system also can comprise an electrical conductor in electromagnetic communication with the magnet arrangement. The electrical conductor can provide an input signal to an electrical control system corresponding to the angular displacement of the shaft.

Further to this aspect, the electrical conductor can comprise a helical coil in electromagnetic communication with the magnet arrangement. The magnetic arrangement can further include a first magnetic extension in electromagnetic communication with and extending from a first pole of the magnet to a first position proximate to a periphery of the rotor. The magnetic arrangement can further include a second magnetic extension in electromagnetic communication with and extending from a second pole of the magnet to a second position proximate to the periphery of the rotor opposite the first position.

Still further in this aspect, the first magnetic extension can be in electromagnetic communication with the magnet via a first support member extending laterally from the first pole of the magnet. Similarly, the second magnetic extension can be in electromagnetic communication with the magnet via a second support member extending laterally from the second pole of the magnet.

Still further in this aspect, the sensor assembly can be configured to detect a first extended valley defined in the plurality of teeth. The period between the detection of the first extended valley corresponds to time taken to complete a single revolution of the shaft. Similarly, the sensor assembly can be further configured to detect a second extended valley defined in the plurality of teeth opposite the first extended valley. The period between the detection of the first extended valley and the second extended valley corresponds to time taken to complete a half revolution of the shaft.

In still another aspect, the present disclosure provides a method of installing a variable reluctance sensing system for measuring the angular displacement of a rotatable shaft disposed through an existing housing. The method can comprise securing a rotor coaxially to the rotatable shaft; the rotor being adapted to rotate in concert with the shaft; situating the rotor at a desired orientation; aligning a sensor assembly with the rotor secured to the shaft; securing the sensor assembly to the housing such that the sensor assembly is disposed within and fixed in relation to the rotor.

Further in this aspect, aligning the sensor assembly with the rotor can include aligning one or more alignment holes defined through the rotor and the sensor assembly; inserting one or more corresponding alignment pins through the alignment holes defined through the rotor and the sensor assembly to maintain the rotor fixed with respect to the sensor assembly while the sensing system is being installed; and removing the one or more corresponding alignment pins once the sensor assembly is secured to the housing. Once the sensor assembly is secured within the housing, the method can further comprise securing a cover to the housing to enclose the sensor assembly within a cavity defined by the housing.

BRIEF DESCRIPTION OF THE DRAWINGS

The invention may be more completely understood in consideration of the following detailed description of various embodiments of the invention in connection with the accompanying drawings, in which.

Figure 1:
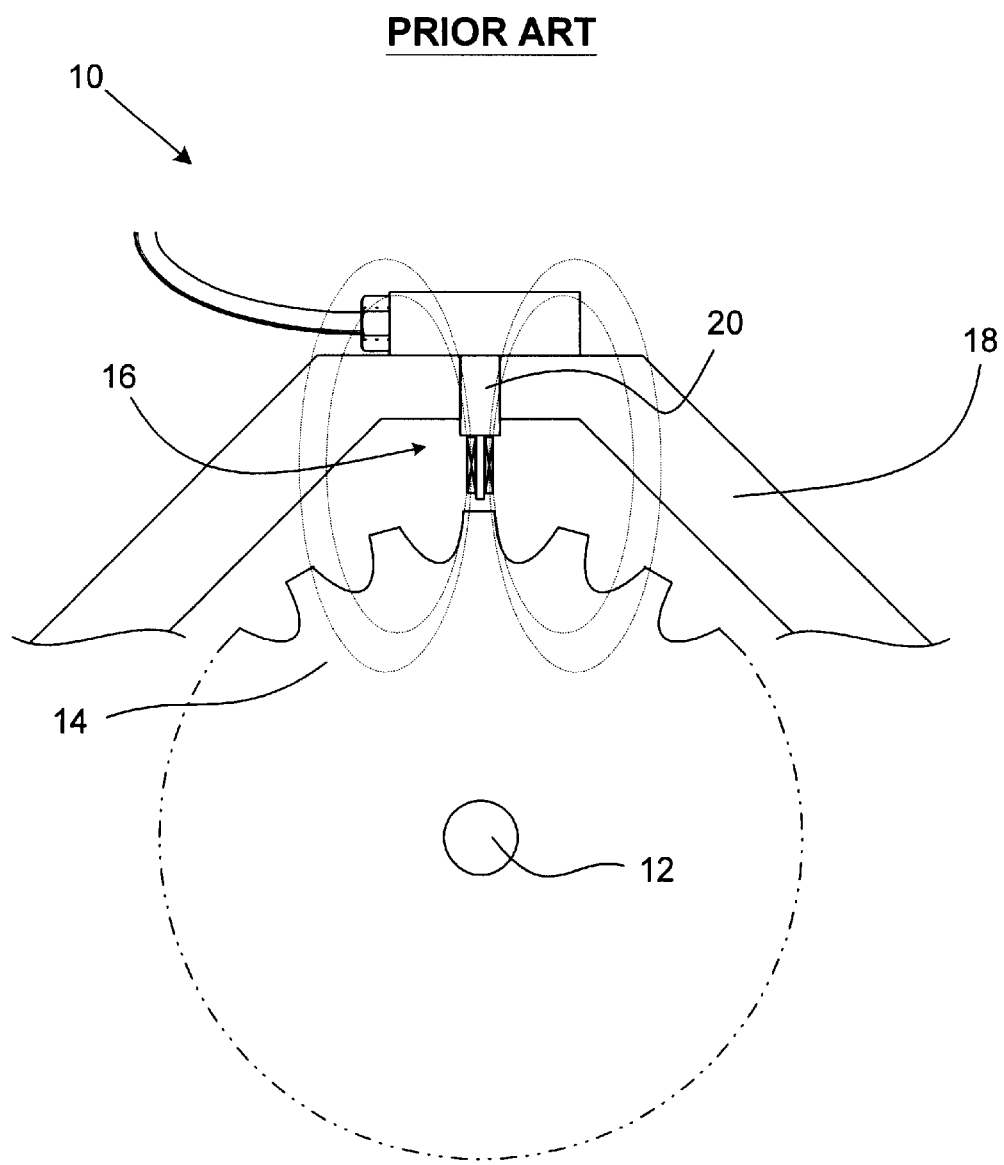
FIG. 1 is a side view of a prior art variable reluctance sensing system used to measure the angular displacement of a rotating shaft.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Various embodiments of the present invention will be described in detail with reference to the drawings, wherein like reference numerals represent like parts and assemblies throughout the several views. Reference to various embodiments does not limit the scope of the present invention, which is limited only by the scope of the claims attached hereto.

As will become apparent from the discussion below in connection with the accompanying drawings, the present disclosure has particularized applicability to sensing systems used to measure the angular displacement of a rotating shaft within an internal combustion engine, such as, an automobile engine, a motorcycle engine, a snowmobile engine, or other similar internal combustion engine. However, it will be appreciated by those having skill in the art that the present disclosure is not limited to the specific embodiments discussed below. Rather, the present disclosure has general applicability to situations where it is desirable to precisely measure the angular displacement of a rotating shaft. Preferably, the sensing system of the present disclosure can be disposed within an existing housing with minimal effort, thereby, providing a reliable mechanism for precisely measuring the angular displacement of a rotating shaft.

Figure 2:
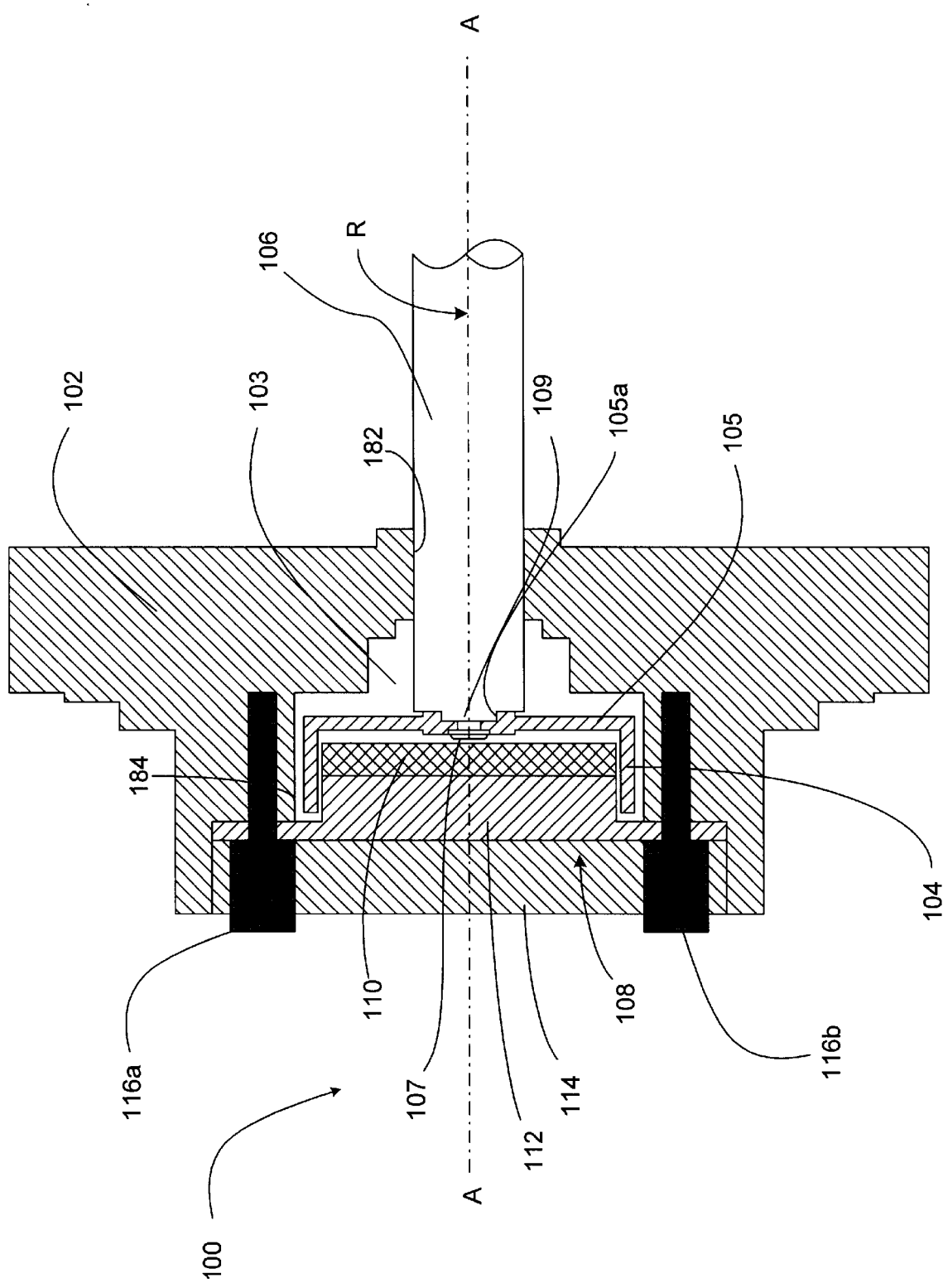
FIG. 2 is a side, cross-sectional view of a variable reluctance sensing system used to measure the angular displacement of a rotating shaft in accordance with the present disclosure.

Now referring to FIG. 2, an exemplary sensing system 100 is shown attached to a housing 102, such as, a transmission housing or an engine crankcase housing that encloses cooperating mechanical parts or components that transmit or supply power to, for example, an automobile or a motorcycle. In the illustrated embodiment, the housing 102 is manufactured from a metallic material, such as, a lightweight nonferrous metal or alloy, for example, aluminum or an aluminum alloy. However, one having ordinary skill in the art will readily appreciate that the housing 102 can be manufactured from any suitable material, such as, a polymeric material, a ceramic material, a ferrous material, or any other similar material. The housing 102 typically includes a cavity 103 having a rotating shaft 106 disposed therethrough. Preferably the sensing system of the present disclosure can be disposed within the existing cavity of the housing 102 without reconfiguring the cavity construction. Generally, the cavity 103 is relatively small and defines an opening 184 having a width of at least about 1.5 inches (about 38.1 mm) and no greater than about 6.0 inches (about 152.4 mm), typically about 2.0–4.0 inches (about 50.8–101.6 mm), and in preferred embodiments about 3.0 inches (about 76.2 mm). However, one having ordinary skill in the art will readily appreciate that the size of the cavity 103 depends upon the size of the housing (and the components contained therein) as well as other similar factors. The rotating shaft 106 extends through an opening 182 in the housing 102 along a central axis A—A. The rotating shaft 106 can be any rotating shaft that is integral with the engine (not shown) or transmission (not shown), such as, an engine camshaft, crankshaft, or timer shaft.

As shown in FIG. 2, the sensing system 100 is preferably coaxially mounted to and situated within the housing 102. In one possible embodiment, the sensing system 100 can comprise a rotor 104 and a sensor assembly 108 disposed within the cavity 103. Preferably, the rotor 104 is manufactured from a metallic material, such as, a lightweight nonferrous metal or alloy as described above. The rotor 104 is generally cylindrical or "cup-shaped" having a base member 105. The base member 105 defines a centrally disposed recessed area 105a that is sized and configured to receive and/or interconnect with an axial extension 109 extending from the shaft 106 as shown in FIG. 2. The recessed area 105a and the axial extension 109 cooperate to ensure that the rotor 104 is coaxially mounted onto the rotating shaft 106.

As shown in the illustrated embodiment, the rotor 104 can be rigidly secured to the rotating shaft 106, thereby, allowing the rotor 104 to rotate in concert with the shaft 106. The rotor 104 can be rigidly secured to the rotating shaft 106 using a conventional fastener 107, such as, a screw, bolt, or other similar fastener. Additionally, the base member 105 can include structure for causing or assisting the rotor 104 to rotate in concert with the shaft 106. For example, the base member 105 can include internal splines (not shown) that intermesh with corresponding external splines (not shown) defined by the shaft 106. However, one skilled in the art will readily appreciate that any type of structure suitable for transferring torque or angular motion between two members (e.g., the rotor 104 and the shaft 106) could be used. Similarly, the base member 105 can include structure for aligning the rotor 104 with the shaft 106. For example, the base member 105 can include a key (not shown) for interfacing with a keyway (not shown) on the shaft 106. Accordingly, the rotor 104 can be aligned with the shaft 106 to correspond with a known angular orientation of the shaft, thereby, facilitating calibration (e.g., phase timing) during and/or after installation of the sensing system 100. Installation of the sensing system 100 will be discussed in greater detail below.

As discussed above, the sensing system 100 also includes a sensor assembly 108. As shown in FIG. 2, the sensor assembly 108 is coaxially disposed within the rotor 104. In the illustrated embodiment, the sensor assembly 108 comprises a magnet arrangement 110 and a sensor housing 112. The magnet arrangement 110 is preferably rigidly secured to and/or sealed within the sensor housing 112. For example, the sensor housing 112 can be sized and configured to support and/or receive the magnet arrangement 110 such that the magnet arrangement 110 extends between the periphery of the rotor 104. In one possible embodiment, the magnet arrangement 110 is secured and sealed within the sensor housing 112 using, for example, a thermosetting plastic material, such as, a phenolic, an epoxy, or other similar material suitable for securing and sealing the magnet arrangement 110 within the sensor housing 112.

The sensor housing 112 is preferably made from the same or similar material as the housing 102. For example, the sensor housing 112 can be manufactured using a lightweight nonferrous metal or alloy, such as, aluminum or an aluminum alloy. However, one having ordinary skill in the art will readily appreciate that the sensor housing 112 can be manufactured from any suitable material, such as, a polymeric material or a nonferrous material. When the magnet arrangement 110 is secured to the sensor housing 112 and coaxially disposed within the rotor 104, the magnet arrangement 110 and the rotor 104 cooperate to define a magnetic circuit (e.g., a closed path in which a magnetic field or magnetic flux is confined) as will be discussed in greater detail below.

Still referring to FIG. 2, a cover 114 extends over the sensor assembly 108 and encloses the sensor assembly 108 within the cavity 103. The cover 114 is preferably manufactured using the same or similar material as the housing 102 (e.g., a lightweight nonferrous metal or alloy) and is rigidly secured to the housing 102 using one or more conventional fasteners, such as, screws, bolts, or other similar fastening devices capable of rigidly securing the cover 114 to the housing 102. In one possible embodiment, the sensor housing 112 can be secured to the cover 114 using one or more conventional fasteners (not shown). In the embodiment illustrated in FIG. 2, the cover 114 is rigidly secured to the housing 102 using first and second bolts 116a, 116b. The first and second bolts 116a, 116b can extend through through-holes 117a, 117b (FIG. 7) of the sensor housing 112 and thread into the housing 102. By this, the cover 114 and the fasteners 116a, 116b can also rigidly secure the sensor housing 112 to the housing 102. As discussed above, the magnet arrangement 110 can be secured and sealed within the sensor housing 112. In an alternative embodiment, however, the magnet arrangement 110 can be secured to the cover 114 in addition to being secured and sealed within the sensor housing 112, thereby, minimizing the number of separate components that are assembled together during installation. In either case, once the cover 114 is rigidly secured to the housing 102, the sensor assembly 108 remains stationary within the cavity 103 as the rotor 104 rotates in concert with the rotating shaft 106 as described above.

The magnet arrangement 110 will now be described in connection with FIGS. 3A and 3B. While many embodiments of the magnet arrangement 110 are contemplated, one skilled in the art will readily appreciate that the magnet arrangement 110 can include any configuration or arrangement of magnets and/or magnetically permeable materials that can be configured to define a magnetic flux path. For example, the magnet arrangement 110 can comprise a single bar magnet disposed within the rotor 104. Alternatively, the magnet arrangement 110 can comprise a magnet used in conjunction with one or more magnetically permeable components as shown in the embodiments illustrated in FIGS.

3A and 3B. Magnetically permeable materials generally include any material capable of supporting the presence of a magnetic flux, such as, any material within the class of ferromagnetic materials, for example, iron and/or iron alloys, or other similar magnetically permeable materials. Furthermore, it will be appreciated by those having ordinary skill in the art that the materials used to manufacture the various component of the magnet arrangement 110 can be selected based upon the operating conditions within the housing 102 (FIG. 2), such as, materials selected for corrosion resistance or other similar properties. Examples of magnetically permeable materials capable of providing corrosion resistance include stainless steel, low carbon material treated with a galvanizing agent, and high-magnetic-saturation materials or alloys, such as, those high-magnetic-saturation materials or alloys manufactured by Carpenter Technology Corporation under the brand names HIPERCO® 50A.

Figure 3A:
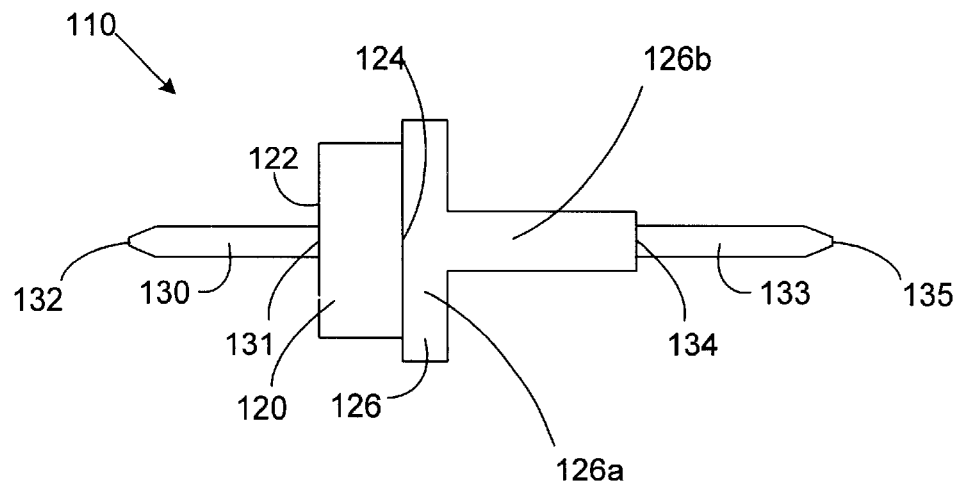
FIG. 3A is a diagram showing one possible embodiment of a magnetic arrangement for use with the variable reluctance sensing system shown in FIG. 2.

In the embodiment illustrated in FIG. 3A, the magnet arrangement 110 can comprise a permanent magnet 120, such as, samarium cobalt ($Sm_2Co_{17}$) or any other suitable material capable of producing a magnetic field outside of itself. The magnet 120 can be generally disc-shaped having a first surface 122 and a second surface 124. As is commonly understood, the magnet 120 includes a first pole P1 and a second pole P2 generally defined along a pole axis P—P (see FIG. 4B); the first surface 122 defining a first pole surface of the magnet 120 and the second surface 124 defining a second pole surface of the magnet 120 having a polarity opposite the first pole. Accordingly, a magnetic field is produced between the first surface 122 (e.g., the first pole) and the second surface 124 (e.g., the second pole) of the magnet 120.

As shown in FIG. 3A, the magnet arrangement 110 can include a first magnetic extension member 130 (e.g., a first pole piece) having a first end 131 and a second end 132 opposite the first end 131. The first end 131 abuts or contacts the first surface 122 (e.g., the first pole) of the magnet 120. The first magnetic extension member 130 is generally flat and pin-shaped and is preferably manufactured from a magnetically permeable material as discussed above. In the illustrated embodiment, the first magnetic extension member 130 extends away from the first surface 122 (e.g., the first pole) of the magnet 120 to a location proximate to the rotor 104 (See FIG. 4A).

Additionally, the magnet arrangement 110 can also include a monolithic spindle 126 that is preferably manufactured from a magnetically permeable material as discussed above. As shown in the illustrated embodiment, the spindle 126 comprises a generally cylindrical base portion 126a and a generally cylindrical support member 126b having a diameter smaller than that of the base portion 126a. The base portion 126a abuts or contacts the second surface 124 (e.g., the second pole) of the magnet 120. The support member 126b extends away from and is transverse to the base portion 126a. Moreover, as shown in FIG. 3A, the magnet arrangement 110 can further include a second magnetic extension 133 (e.g., a second pole piece). As with the first magnetic extension member 130, the second magnetic extension member 133 has a first end 134 and a second end 135 opposite the first end 134. The second magnetic extension member 133 is generally pin-shaped and is preferably manufactured from a magnetically permeable material as discussed above. The first end 134 abuts or contacts the support member 126b of the spindle 126. In the illustrated embodiment, the second magnetic extension member 133 extends away from the spindle 126 to a location proximate to the rotor 104 (See FIG. 4A).

The first and second magnetic extension members 130, 133 are in electromagnetic communication with and extend away from the magnet 120. In particular, as discussed above, the first magnetic extension member 130 abuts or contacts the first surface 122 (e.g., the first pole) of the magnet 120. Similarly, the second magnetic extension member 133 is in electromagnetic communication with the magnet 120 (e.g., the second surface 122 or the second pole) via the spindle 126. Accordingly, the magnet arrangement 120 defines a magnetic flux path through each of the first and second magnetic extension members 130, 133.

Figure 3B:
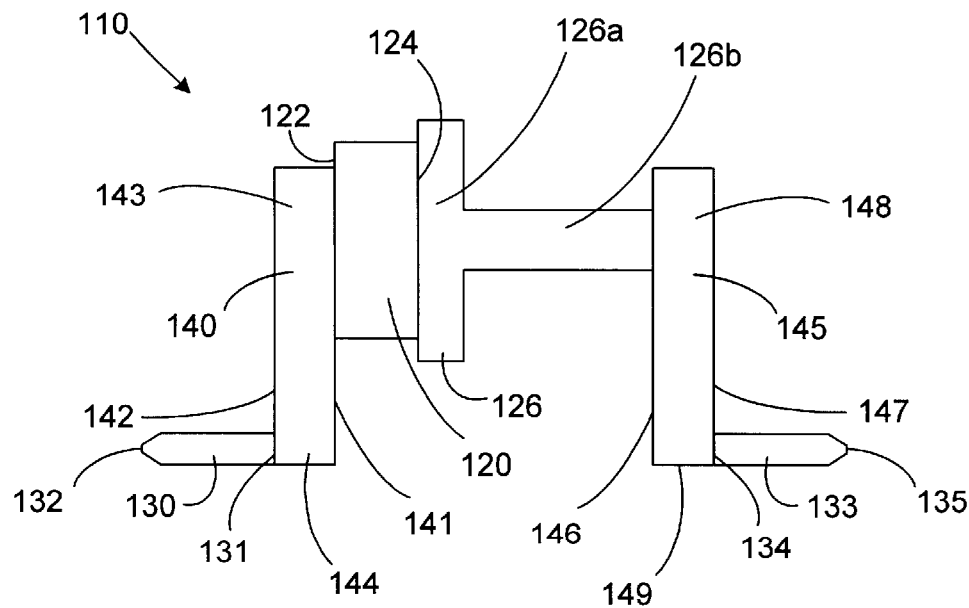
FIG. 3B is a diagram showing an alternative embodiment of a magnetic arrangement for use with the variable reluctance sensing system shown in FIG. 2.

FIG. 3B illustrates an alternative embodiment of the magnet arrangement 110. In addition to the components discussed above in connection with the embodiment illustrated in FIG. 3A, the magnet arrangement 110 also can include a first lateral support or leg member 140 in electromagnetic communication with the magnet 120. The first lateral support member 140 is preferably manufactured from a magnetically permeable material as discussed above. In the illustrated embodiment, the first lateral support member 140 is generally a polygonal member having a support surface 141 extending along and in abutment with the first surface 122 (e.g., the first pole) of the magnet 120. The first lateral support member 140 has a proximal end 143 and a distal end 144 opposite the proximal end 142. At or near the proximal end 143, the first lateral support member 140 abuts or contacts the magnet 120. At the distal end 144, the first lateral support member 140 abuts or contacts the first magnetic extension member 130. The first magnetic extension member 130 extends away from a surface 142 opposite the support surface 141 towards a location proximate to the rotor 104 (See FIG. 4A).

Similarly, in the embodiment illustrated in FIG. 3B, the magnet arrangement 110 can also include a second lateral support or leg member 145 in electromagnetic communication with the magnet 120. More particularly, as shown in FIG. 3B, the second lateral support member 145 contacts the spindle 126 which is in electromagnetic communication with the second surface 124 of the magnet 120 as discussed above. The second lateral support member 145 is preferably manufactured from a magnetically permeable material as discussed above. In the illustrated embodiment, the second lateral support member 145 is generally a polygonal member having a support surface 146 extending along and in abutment with the spindle 126. The second lateral support member 145 has a proximal end 148 and a distal end 149 opposite the proximal end 148. At the proximal end 148, the second lateral support member 145 abuts or contacts the support member 126b of the spindle 126. At the distal end 149, the second lateral support member 145 abuts or contacts the second magnetic extension member 133. The second magnetic extension member 133 extends away from a surface 147 opposite the support surface 146 towards a location proximate to rotor 104 (See FIG. 4A).

The first and second lateral support members 140, 145 increase the distance between the magnet 120 and the first and second magnetic extension members 130, 133. In particular, the first and second lateral support members 140, 145 increase the lateral distance between the magnet 120 and the first and second magnetic extension members 130, 133. One having ordinary skill in the art will readily appreciate that the exact configuration of the first and second lateral support members 140, 145 (and, therefore, the magnet arrangement 110) can vary according to, for example, the shape and/or configuration of the sensor housing 112.

As with the embodiment illustrated in FIG. 3A, the first and second magnetic extension members 130, 133 are in electromagnetic communication with and extend away from the magnet 120. In particular, as discussed above, the first magnetic extension member 130 is in electromagnetic communication with the magnet 120 (e.g., the first surface 122 or the first pole) via the first lateral support member 140.

Similarly, the second magnetic extension member 133 is in electromagnetic communication with the magnet 120 (e.g., the second surface 124 or the second pole) via the spindle 126 and the second lateral support member 145. Accordingly, the magnet arrangement 120 defines a magnetic flux path through each of the first and second magnetic extension members 130, 133.

Figure 4A:
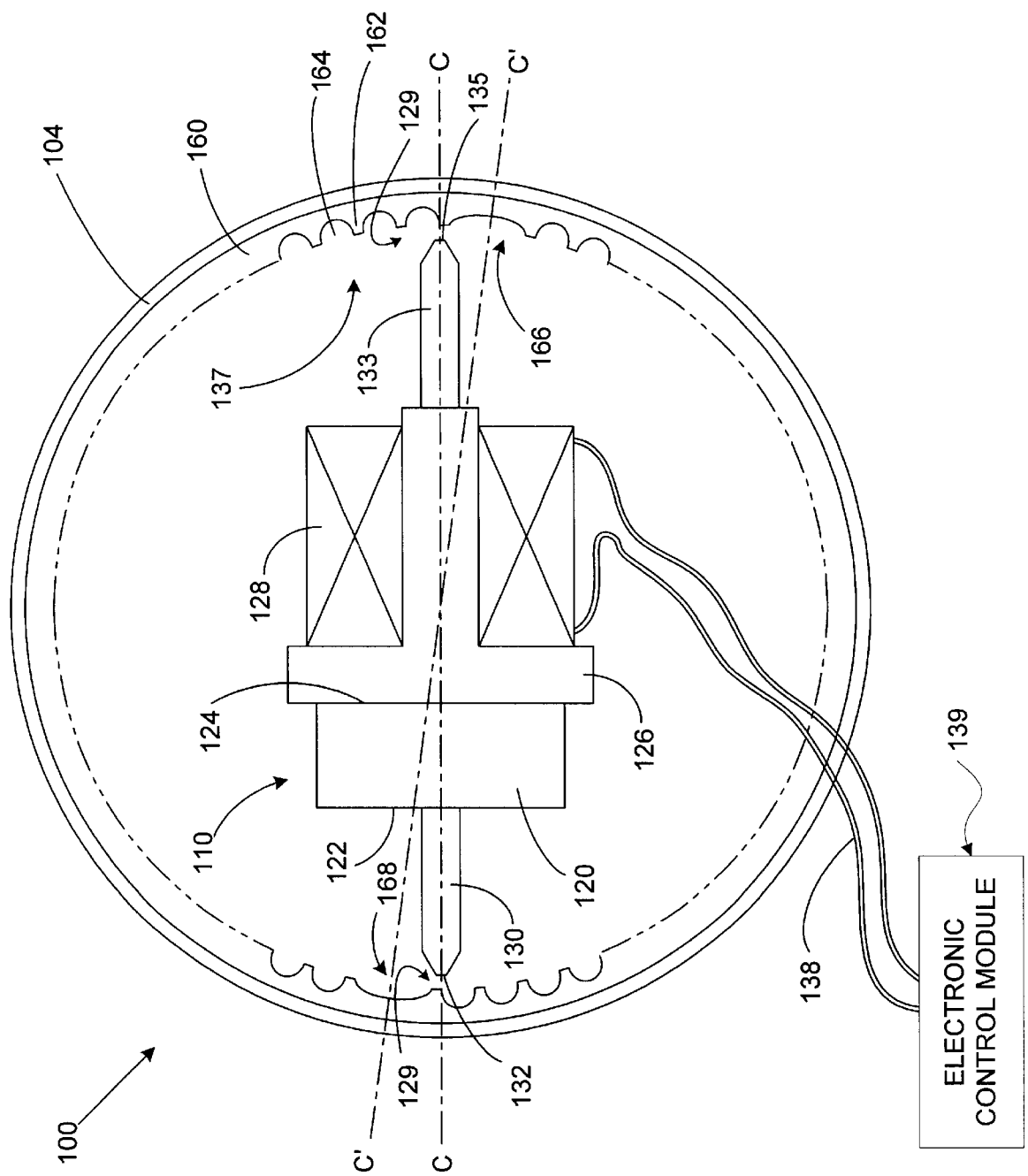
FIGS. 4A–4B are schematic illustrations showing the magnetic circuit defined by the sensing system of the present disclosure.
Figure 4B:
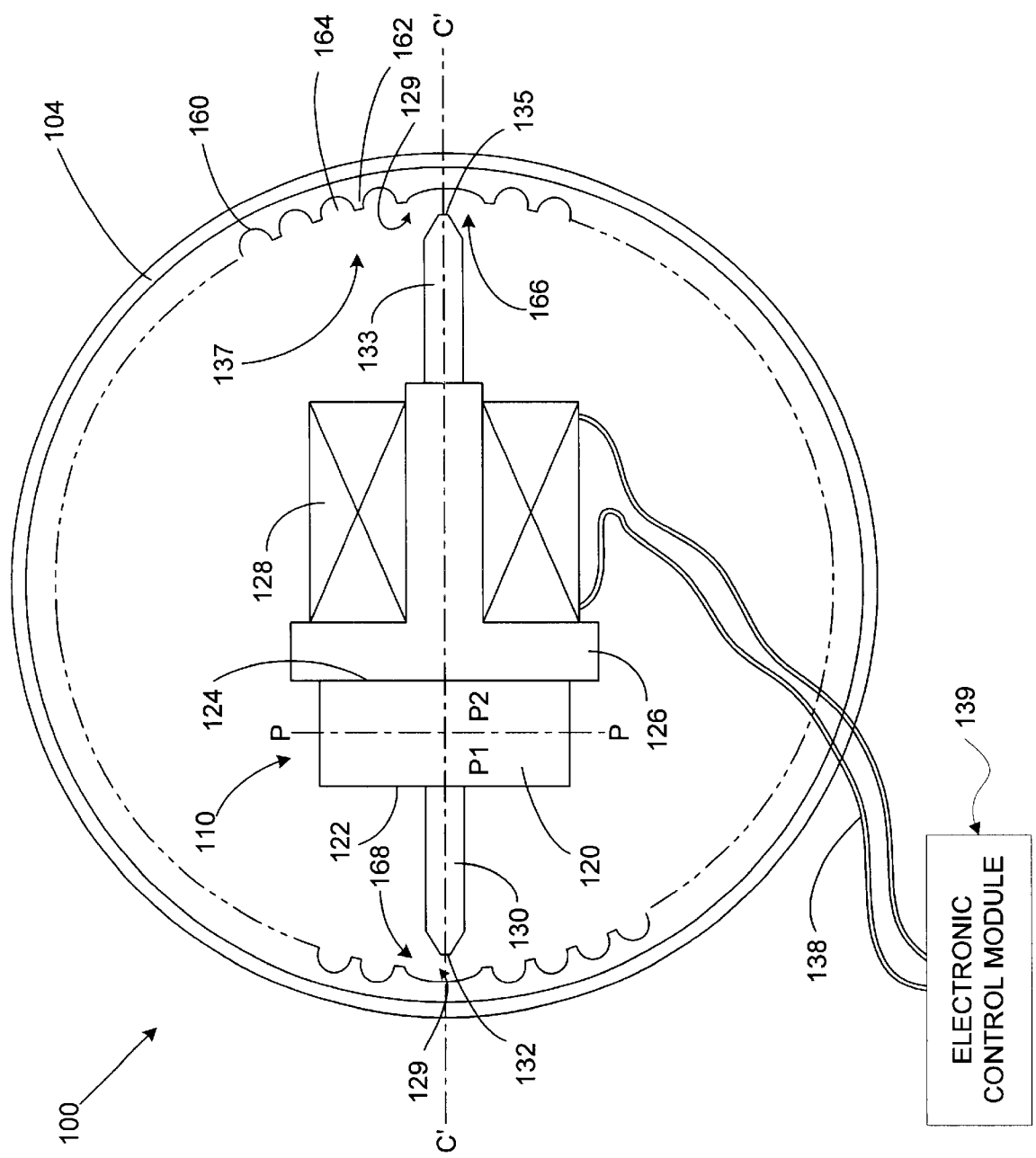

FIGS. 4A–4B are schematic illustrations of the sensing system 100 in accordance with the principles of the present disclosure. In the illustrated embodiment, the magnet arrangement 110 is shown disposed within the rotor 104. As shown in FIG. 4A, the rotor 104 defines a plurality of teeth 137 that extend radially inwardly with respect to the center of the rotor 104. By "radially inwardly," it is generally meant that each of the teeth 137 extends inwardly in a direction towards an axis A—A (FIG. 1) that passes through the center of the rotor 104 and the rotating shaft 106.

In one possible embodiment, the rotor 104 and the plurality of teeth 137 can comprise a monolithic structure manufactured from a magnetically permeable material as discussed above. In an alternative embodiment, however, the plurality of teeth 137 can be a separate ring-link member that is seated and secured (via an interference fit, an adhesive, etc.) within the rotor 104. For example, in the embodiment illustrated in FIG. 4A, the plurality of teeth 137 comprise a separate inner ring member 160 that is concentrically seated and secured within the rotor 104. The ring member 160 can be secured within the rotor 104 via an interference fit or, alternatively, using one or more conventional mechanical fasteners or an adhesive. In this embodiment, the inner ring member 160 can be manufactured from a magnetically permeable material as discussed above while the rotor 104 can be manufactured from a lightweight nonferrous metal or alloy as discussed above.

As shown in FIG. 4A, the first and second magnetic extension members 130, 133 (e.g., pole pieces) are situated longitudinally coincident with respect to one another. By "longitudinally coincident," it is generally meant that each of the second ends 132, 135 are centered about an axis C—C extending through the center of the magnet arrangement 120 and transverse to the axis of rotation A—A (FIG. 2). Furthermore, each of the second ends 132, 135 of the first and second magnetic extension members 130, 133, respectively, are situated proximate to the inner ring member 160. In particular, the length of the magnet arrangement 110 (e.g. the length extending between the second ends 132, 135 of the first and second magnetic extension members 130, 133, respectively) extends between a periphery of the rotor 104, thereby, allowing the magnet arrangement 110 to be disposed within the rotor 104. Moreover, the magnet arrangement 110 is sized such that a small clearance or gap 129 exists between each of the second ends 132, 135 of the first and second magnetic extension members 130, 133 and the rotor 104 when the magnet arrangement 110 is coaxially disposed within the rotor 104. As is commonly understood, the gap 129 is preferably small (e.g., less than 0.10 inches (2.5 mm)) so as to minimize the magnetic reluctance between the magnet arrangement 110 and the rotor 104 as described below.

As mentioned above, the magnet arrangement 110 and the rotor 104 cooperate to define a magnetic circuit (e.g., a closed path in which a magnetic field or magnetic flux is confined). In particular, the magnet arrangement 110 and the inner ring member 160 cooperate to define a magnetic flux path from the magnet 120 through, for example, the first magnetic extension member 130 and circumferentially (in either direction) around the rotor 104 through the inner ring member 160. The magnetic flux path is completed through the second magnetic extension member 132 and the spindle 126.

As discussed above, the rotor 104 rotates in concert with the rotating shaft 106 (FIG. 2) while the magnet arrangement 110 remains fixed or stationary within the housing 102. Thus, as the rotor 104 changes angular position, a change in the magnetic flux path results due to the varying contour of the inner ring member 160 (e.g., the plurality of teeth 137). The magnetic reluctance of the magnetic circuit can, therefore, be sensed as each of the magnetic extension members 130, 133 pass over one of the teeth 137 or, alternatively, over a valley 164 between each of the teeth 137. For example, when the magnetic extension members 130, 133 are positioned adjacent to one of the teeth 137, the magnetic reluctance in the magnetic circuit is minimized. Conversely, when the magnetic extension members 130, 133 are positioned adjacent to a valley 164, the magnetic reluctance in the magnetic circuit is maximized. Because the teeth 162 are evenly spaced, the magnetic flux through the magnetic circuit changes at a constant interval.

As shown in FIGS. 4A–4B, one or more teeth can be removed from the inner ring 160 to define a first extended valley 166 between two adjacent teeth 137. The extended valley 166 creates a longer interval between the teeth 137. Thus, as the magnet arrangement 110 is positioned adjacent the extended valley 166, the period of high magnetic reluctance is increased relative to the constant intervals between each adjacent tooth 162. The sensing system 100 is able to detect the extended interval caused by the extended valley 166 by measuring each period length and comparing it with the previous period. Accordingly, the time required for the inner ring member 160 to complete one full revolution can be determined by detecting the first extended valley 166 and measuring the amount of time elapsed until the first extended valley 166 is detected again. In the illustrated embodiment, a second extended valley 168 can be provided along the inner ring 160 opposite the first extended valley 166 across the axis of rotation A—A (FIG. 2). Accordingly, time required to detect one of the extended valleys 166, 168 occurs every half revolution of the shaft 126 (FIG. 2). Thus, the time required for the inner ring member 160 to complete one half revolution can be determined by detecting first extended valley 166 and measuring the amount of time elapsed until the second extended valley 168 is detected. FIG. 4B illustrates the magnetic circuit where the second ends 132, 135 of the first and second magnetic extension members 130, 133, respectively, are situated proximate the extended valleys 166, 168 and are centered about an axis C'—C' extending through the center of the magnet arrangement 120 and transverse to the axis of rotation A—A (FIG. 1).

As shown in the illustrated embodiment, a coil 128 can be utilized to detect and/or measure the change in magnetic flux through the magnetic circuit. The coil 128 can be situated on support member 126b (FIGS. 3A or 3B) of the spindle 126. In one possible embodiment, the coil 128 can comprise one or more turns of an electrical conductor wound as a unit around or about a bobbin (not shown) received on the support member 126b. Furthermore, as is commonly understood in the art, the coil 128 can be a helical coil of an electrical conductor that is in electromagnetic communication with the magnet 120. As the rotor 104 rotates in concert with the shaft 106 causing the magnetic flux through the magnetic circuit to change, a voltage is generated in the coil 128 as is commonly understood in the art. The amplitude of the voltage generated in the coil 128 increases from zero as the rotational speed of the shaft 126 increases until it reaches a maximum value. Conversely, the amplitude of the voltage generated in the coil 128 decreases towards zero as the rotation speed of the shaft 126 decreases until it stops.

The coil 128 can be electrically coupled to an electronic controller 139 via a pair of electrical conductors 138. In particular, the electronic controller 139 can be coupled to other engine control systems control engine performance events, such as, engine ignition events, fuel injection events, as well as other similar engine functions or performance events. Thus, for example, an input signal can be provided to an engine ignition system to generate a spark when an engine is preparing to initiate its power stroke (e.g., when the piston is near top dead center). Similarly, an input signal can be provided to a fuel injection system to precisely control or regulate the distribution of fuel into the intake manifold or combustion chamber. As a result, overall engine performance can be improved.

Figure 5:
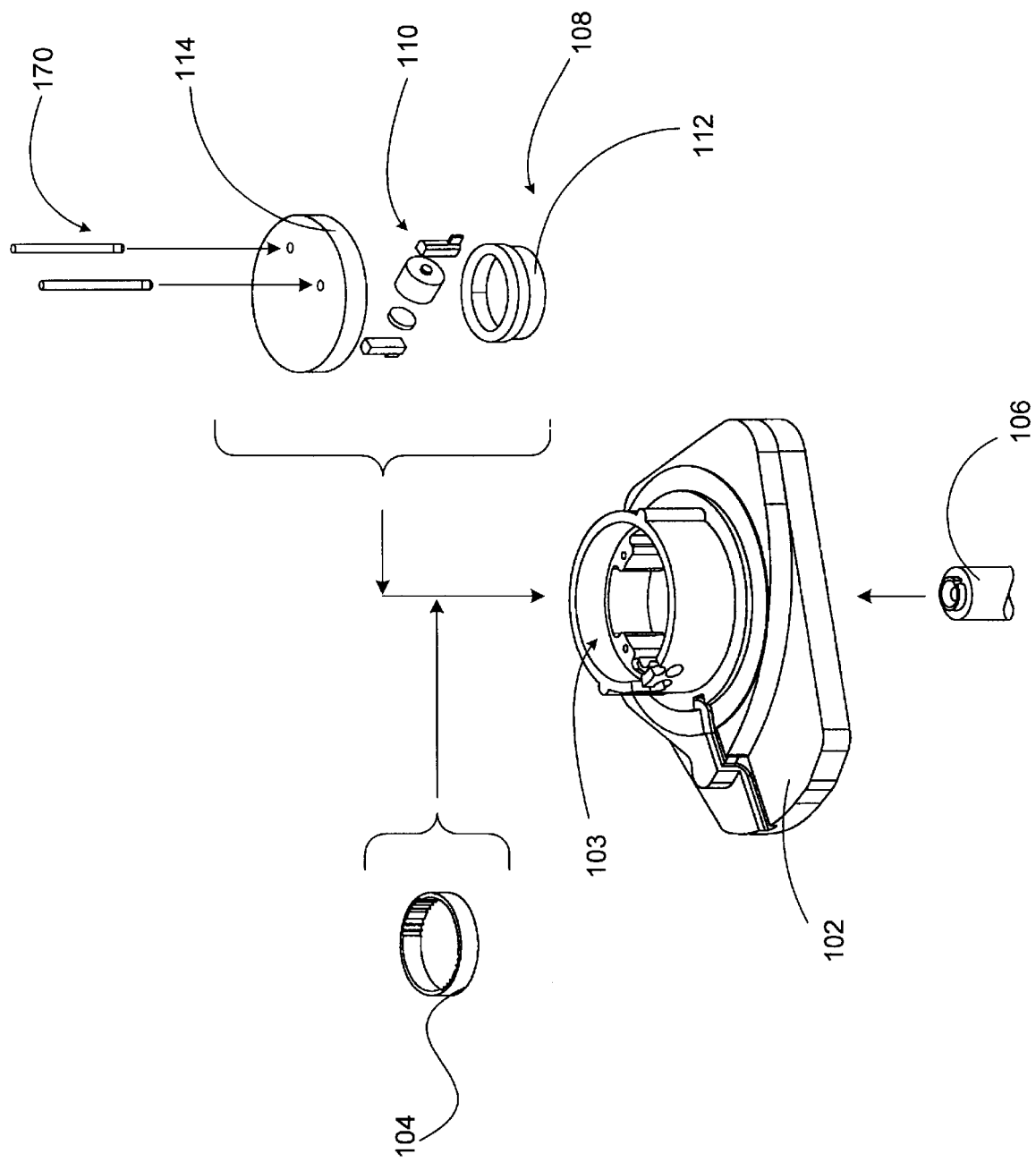
FIG. 5 is an exploded, isometric view of a sensing system being assembled in accordance with the principles of the present disclosure.

FIG. 5 is an exploded, perspective view of the various components of the sensing system 100 capable of being rigidly secured to a housing 102. As discussed above, the rotor 104 is disposed within the cavity 103 of the housing 102 and is coaxially mounted onto the rotatable shaft 106. In the illustrated embodiment, the rotor 104 is rigidly secured to the rotatable shaft 106, thereby, allowing the rotor 104 to rotate in concert with the shaft 106. Once the rotor 104 has been secured to the rotatable shaft 106, the sensor assembly 108 (e.g., the magnet arrangement 110 and the sensor housing 112) can be coaxially disposed within the rotor 104. As discussed above, the magnet arrangement 110 is preferably rigidly secured to and/or sealed within the sensor housing 112. Once the sensor assembly 108 is disposed within the rotor 104, the cover 114 can be installed to enclose the sensor assembly 108 within the cavity 103 of the housing 102.

Figure 6:
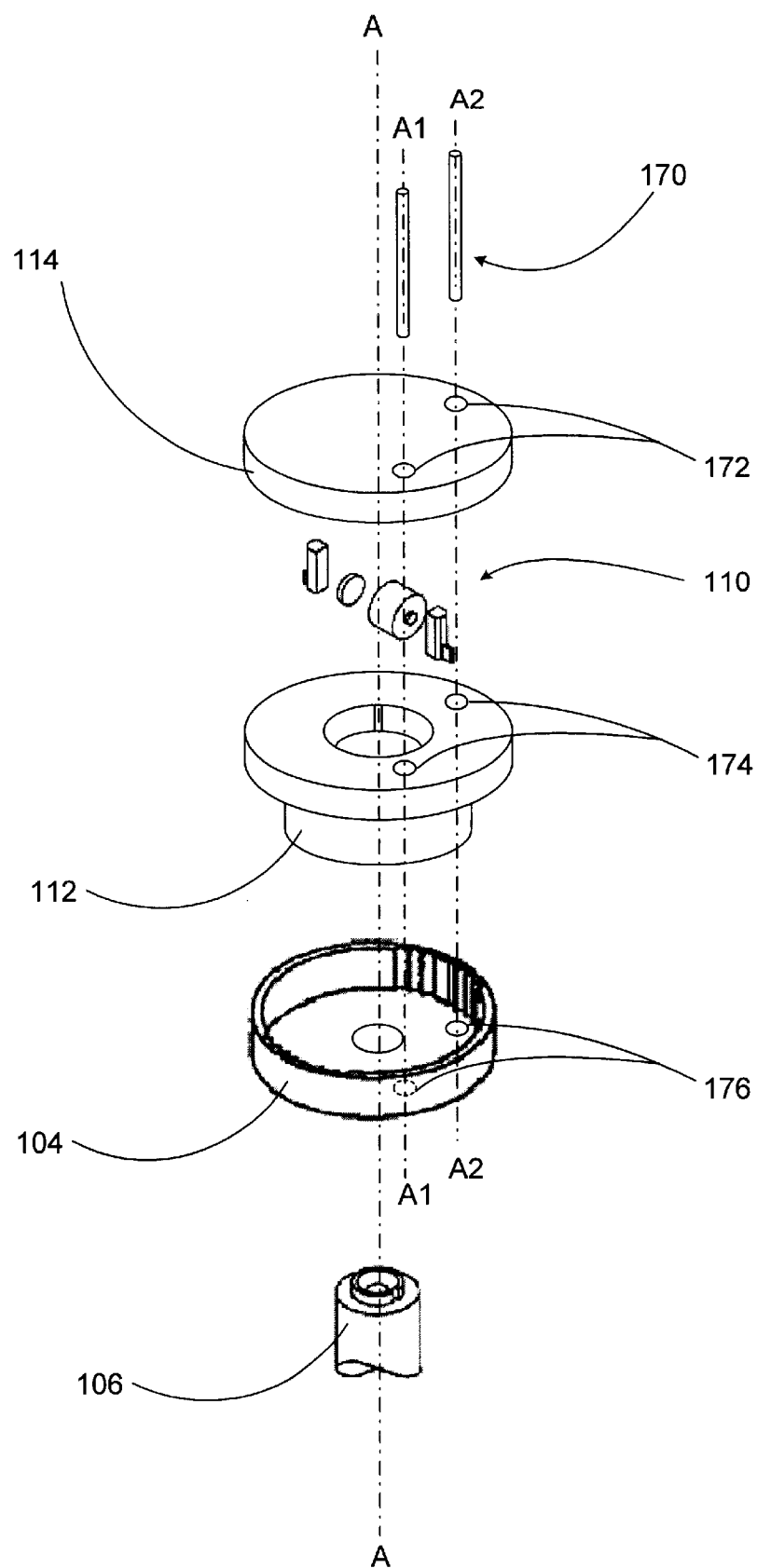
FIG. 6 is an exploded, isometric view of a sensing system being assembled and aligned in accordance with the principles of the present disclosure.

In addition to the assembly described above, the variable reluctance sensing system 100 of the present disclosure includes structure for maintaining the alignment of the rotating component with respect to the stationary components during installation. In particular, the sensing system 100 includes structure for properly aligning the sensor assembly 108 within the rotor 104. As a result, no additional calibration of the sensing device 100 is required after installation. As shown in FIG. 6, the cover 114, the sensor housing 112, and the rotor 104 each include alignment holes for properly aligning the sensor assembly 108 within the rotor 104. In particular, the cover 114 can include one or more cover alignment holes 172; the sensor housing 112 can include one or more housing alignment holes 174; and the rotor 104 can include one or more rotor alignment holes 176. After the rotor 104 has been rigidly secured to the rotatable shaft 106 and rotated to the desired orientation, the sensor assembly 108 and cover 114 can be aligned with the rotor 104 by coaxially aligning the alignment holes 172, 174, 176 such that each hole extends through the first and second alignment axes $A_1$—$A_1$, $A_2$—$A_2$ as shown in FIG. 6. A pair of alignment pins 170 can be inserted through the alignment holes 172, 174, 176 to maintain the sensor assembly 108, cover 172, and rotor 104 fixed with respect to one another while the sensing system 100 is being assembled.

Accordingly, the rotor 104 can be aligned with the shaft 106 to correspond with a known angular orientation of the shaft, thereby, facilitating calibration (e.g., phase timing) during and/or after installation of the sensing system 100. For example, once the rotor 104 has been secured to the rotatable shaft 106, the rotor 104 can be rotated to a known angular orientation (e.g., when the first piston is at top dead center). The sensing system 108 can, therefore, be calibrated to provide electrical signals based upon this known position of the rotor 104 as discussed above.

Figure 7:
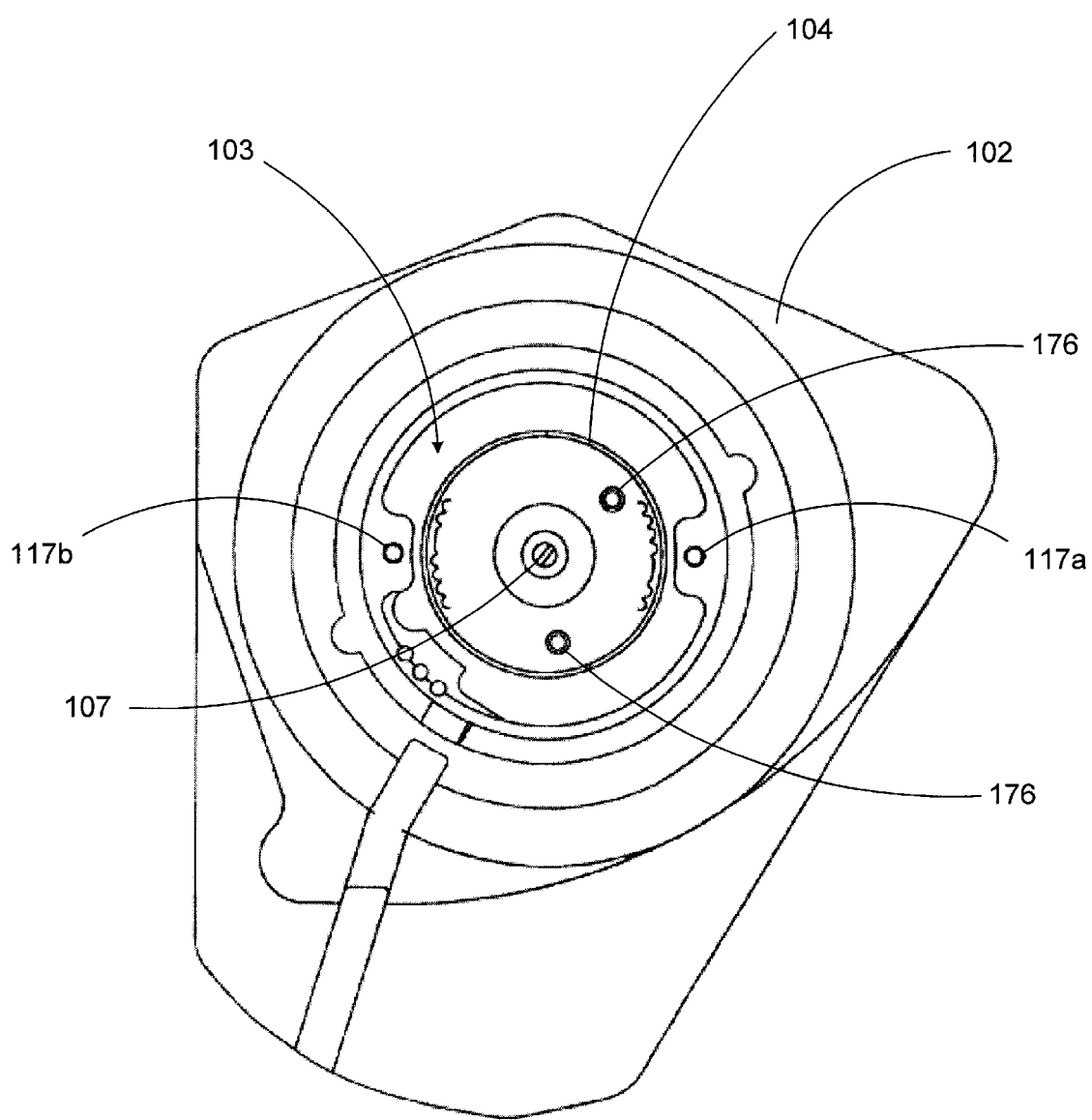
FIG. 7 is a side elevation view of the sensing system secured to a housing without the cover installed in accordance with the principles of the present disclosure.
Figure 8:
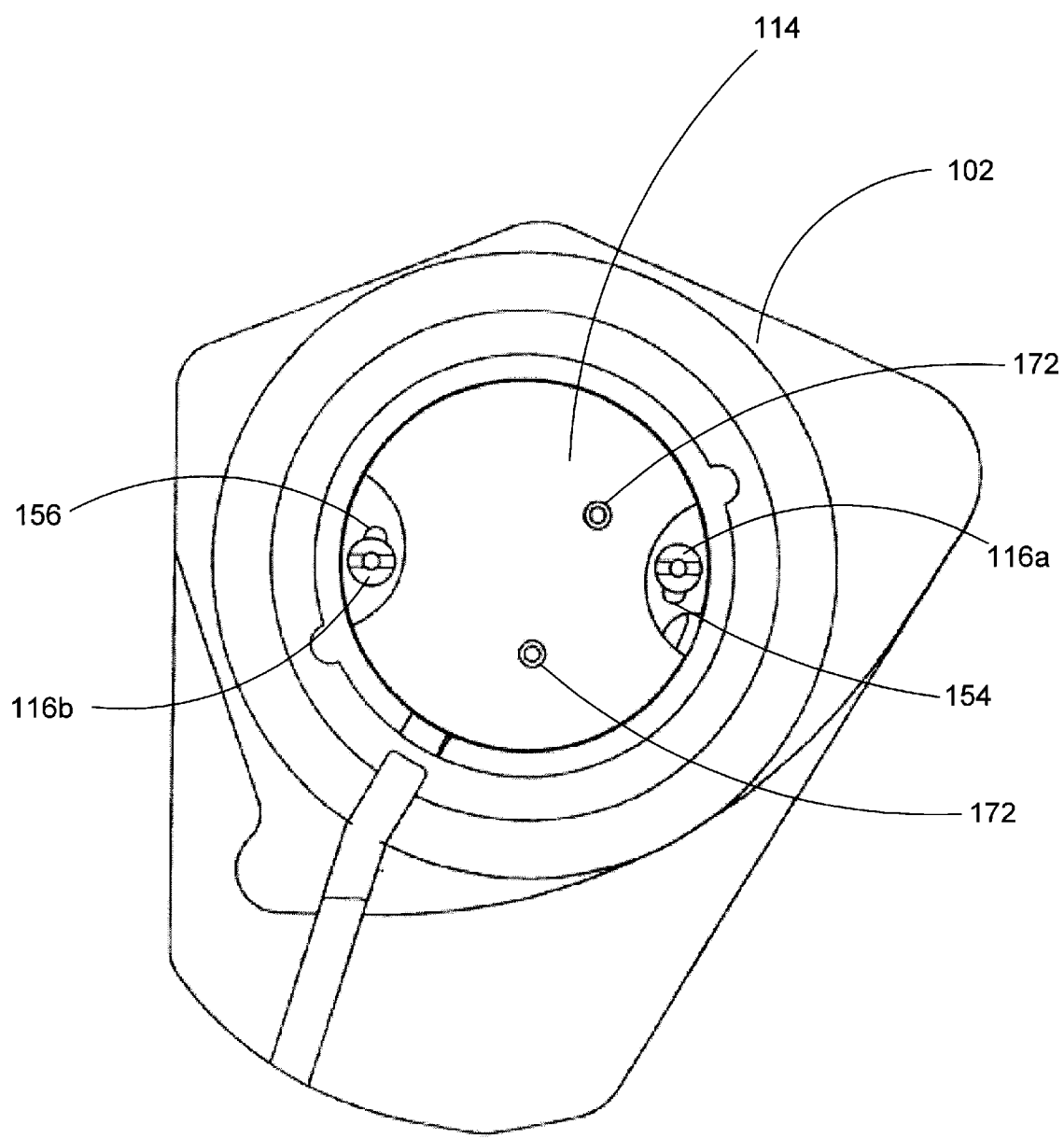
FIG. 8 is a side elevation view of the sensing system secured to a housing having the cover installed in accordance with the principles of the present disclosure.

FIGS. 7 and 8 illustrate a plan view of the housing 102 as the various components of the sensing system 100 are being installed. As shown in FIG. 8, the cover 114 extends over and encloses the sensor assembly 108 within the cavity 103. In the illustrated embodiment and as discussed above, the cover 114 is rigidly secured to the housing 102 using first and second bolts 116a, 116b. The cover includes first and second slotted holes 154, 156 that allow the cover alignment holes 172 and the sensor housing alignment holes 174 to be aligned with the rotor alignment holes 172 as discussed above. Once the alignment holes 172, 174, 176 are properly aligned, the cover 114 and the sensor assembly 108 can be rigidly secured to the housing 102 to fix the alignment of the sensor assembly 108 with respect to the rotor 104. Once installation is complete, the alignment pins 170 can be removed.

The various embodiments described above are provided by way of illustration only and should not be construed to limit the invention. Those skilled in the art will readily recognize the various modifications and changes which may be made to the present invention without strictly following the exemplary embodiments illustrated and described herein, and without departing from the true spirit and scope of the present invention, which is set forth in the following claims.

The claimed invention is:

1. A variable reluctance sensing system for measuring the angular displacement of a rotatable shaft, the sensing system comprising:
    (a) a rotor being constructed and arranged to be securably mounted to the shaft such that the rotor is capable of rotating in concert with the shaft; the rotor defining a plurality of teeth extending radially inwardly towards a center of the shaft; and
    (b) a sensor assembly disposed in a fixed position relative to the rotor, the sensor assembly comprising:
        (i) a sensor housing; and
        (ii) a magnet arrangement disposed within the sensor housing; the magnet arrangement defining a magnetic flux path between the sensor assembly and the rotor, the magnet arrangement including:
            (1) a magnet having a first pole and a second pole;
            (2) a first pole member in electromagnetic communication with the first pole of the magnet;
            (3) a second pole member spaced from the magnet and in electromagnetic communication with the second pole of the magnet; and
        (iii) an electrical conductor configured to detect variations in the magnetic flux path.

2. The sensing system of claim 1, wherein the electrical conductor includes a coil in electromagnetic communication with the magnet arrangement; the coil providing an input signal to an electrical control system corresponding to the angular displacement of the shaft.

3. The sensing system of claim 2, wherein the electrical conductor comprises a helical coil in electromagnetic communication with the magnet arrangement.

4. The sensing system of claim 1, wherein:
    (a) the first pole member is in electromagnetic communication with the magnet via a first support member extending laterally from the first pole of the magnet; and
    (b) the second pole member is in electromagnetic communication with the magnet via a second support member extending laterally from the second pole of the magnet.

5. The sensing system of claim 1, wherein the plurality of teeth comprise a separate inner ring member that is concentrically seated and secured within the rotor.

6. The sensing system of claim 1, wherein the sensor assembly is configured to detect a first extended valley defined in the plurality of teeth; wherein the period between the detection of the first extended valley corresponds to time taken to complete a single revolution of the shaft.

7. The sensing system of claim 6, wherein the sensor assembly is further configured to detect a second extended valley defined in the plurality of teeth opposite the first extended valley; wherein the period between the detection of the first extended valley and the second extended valley corresponds to time taken to complete a half revolution of the shaft.

8. The sensing system of claim 1, wherein the sensing system is sized to fit within an existing housing defining a cavity having a width less than 6.0 inches.

9. A variable reluctance sensing system for measuring the angular displacement of a rotatable shaft, the sensing system comprising:
(a) a rotor being constructed and arranged to be securably mounted to the shaft such that the rotor is capable of rotating in concert with the shaft; the rotor defining a plurality of teeth extending radially inwardly towards a center of the shaft;
(b) a sensor assembly disposed within the rotor, the sensor assembly comprising:
(i) a sensor housing; and
(ii) a magnet arrangement disposed within the housing; the magnet arrangement defining a magnetic flux path between the sensor assembly and the rotor; the magnet arrangement comprising:
(A) a permanent magnet; and
(B) at least a first magnetic extension and a second magnetic extension, the first and second magnetic extensions being in electromagnetic communication with and extending from the magnet to a position proximate to a periphery of the rotor; and
(c) a support piece positioned between the magnet and at least one of the first and second magnetic extensions, the support piece having an electrical conductor in electromagnetic communication with the magnet arrangement; the electrical conductor providing an input signal to an electrical control system corresponding to the angular displacement of the shaft.

10. The sensing system of claim 9, wherein the electrical conductor comprises a helical coil in electromagnetic communication with the magnet arrangement.

11. The sensing system of claim 9, wherein:
(a) the first magnetic extension is in electromagnetic communication with and projects outwardly from a first pole of the magnet to a first position proximate to a periphery of the rotor; and
(b) the second magnetic extension is in electromagnetic communication with and projects outwardly from the support piece to a second position proximate to the periphery of the rotor opposite the first position.

12. The sensing system of claim 9, wherein:
(a) the first magnetic extension is in electromagnetic communication with the magnet via a first support member extending laterally from the first pole of the magnet; and
(b) the second magnetic extension is in electromagnetic communication with the magnet via a second support member extending laterally from the support piece.

13. The sensing system of claim 9, wherein the plurality of teeth comprise a separate inner ring member that is concentrically seated and secured within the rotor.

14. The sensing system of claim 9, wherein the sensor assembly is configured to detect a first extended valley defined in the plurality of teeth; wherein the period between the detection of the first extended valley corresponds to time taken to complete a single revolution of the shaft.

15. The sensing system of claim 14, wherein the sensor assembly is further configured to detect a second extended valley defined in the plurality of teeth opposite the first extended valley; wherein the period between the detection of the first extended valley and the second extended valley corresponds to time taken to complete a half revolution of the shaft.

16. The sensing system of claim 9, wherein the sensing system is sized to fit within an existing housing defining a cavity having a width less than 6.0 inches.

17. A variable reluctance sensing system for measuring the angular displacement of a rotatable shaft, the sensing system comprising:
(a) a rotor mounted to the rotatable shaft, the rotor including:
(i) an inner diameter; and
(ii) a plurality of teeth positioned along the inner diameter;
(b) a sensor assembly for sensing rotation of the rotor, the sensor assembly including:
(i) a magnet having:
(1) a first pole having a first pole surface; and
(2) a second pole having a second pole surface;
(3) the first and second poles being defined generally along a pole axis;
(ii) an electrical conductor support member position adjacent the second surface of the magnet;
(iii) a first pole member projecting outward from the first pole surface in a direction perpendicular to the pole axis;
(iv) a second pole member projecting outward from the second pole surface in a direction opposite the first pole member; and
(v) an electrical conductor position on the electrical conductor support member to generate a signal relating to the angular displacement of the rotatable shaft.

18. The sensing system of claim 17, wherein:
(a) the first pole member of the sensor assembly is coaxially aligned with the second pole member of the sensor assembly.

19. The sensing system of claim 18, wherein:
(a) the first and second pole members of the sensor assembly are pin-shaped.

20. The sensing system of claim 17, wherein:
(a) the support member is disposed bet ween the second pole member and the magnet.

21. The sensing system of claim 20, wherein:
(a) the second pole member projects outward from the support member.

22. The sensing system of claim 18, wherein:
(a) the first pole member of the sensor assembly projects from a first leg member positioned proximate the first surface of the magnet; and
(b) the second pole member of the sensor assembly projects from a second leg member positioned proximate the second surface of the magnet.

23. The sensing system of claim 17, wherein:
(a) the first pole member includes:
(i) a first end positioned adjacent the first pole surface of the magnet; and
(ii) a second end opposite the first end positioned adjacent the rotor;
(b) the second pole member includes:
(i) a first end positioned proximate the second pole surface of the magnet; and
(ii) a second end opposite the first end positioned adjacent the rotor.

* * * * *